United States Patent [19]

Leblans et al.

[11] Patent Number: 5,630,963
[45] Date of Patent: May 20, 1997

[54] CLASS OF STABILIZING COMPOUNDS FOR PHOSPHOR SCREENS

[75] Inventors: Paul Leblans, Kontich; Paul Lardon, Wijnegem; Jean-Marie Dewanckele, Drongen, all of Belgium

[73] Assignee: Agfa-Gevaert, N.V., Mortsel, Belgium

[21] Appl. No.: 654,613

[22] Filed: May 29, 1996

[30] Foreign Application Priority Data

Jun. 1, 1995 [EP] European Pat. Off. ............ 95201433

[51] Int. Cl.⁶ .......................... C09K 11/61; G01T 1/10
[52] U.S. Cl. ................ 252/301.36; 252/301.4 H; 252/301.4 R; 250/483.1; 428/690
[58] Field of Search ................ 252/301.36, 301.4 H, 252/301.4 R; 428/690; 250/483.1

[56] References Cited

U.S. PATENT DOCUMENTS

| | | | |
|---|---|---|---|
| 4,344,877 | 8/1982 | Nikles et al. | 524/102 |
| 4,900,641 | 2/1990 | Kohda et al. | 428/690 |

FOREIGN PATENT DOCUMENTS

| | | | |
|---|---|---|---|
| 4141661 | 7/1992 | Germany. | |

*Primary Examiner*—Melissa Bonner
*Attorney, Agent, or Firm*—Breiner & Breiner

[57] ABSTRACT

A phosphor screen is provided comprising a satiblizer being an organic compound or an oligomeric or polymeric compound comprising moieties corresponding to the following general formula I:

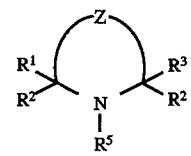

wherein:

$R^1, R^2, R^3$ and $R^4$ each independently represent a substituted or unsubstituted alkyl- or aryl group, $R^5$ represents hydrogen or a substituted or unsibstituted alkyl group and Z represents the atoms necessary to form a substituted or unsubstituted 5 to 8 membered ring.

7 Claims, No Drawings

CLASS OF STABILIZING COMPOUNDS FOR PHOSPHOR SCREENS

DESCRIPTION

1. Field of the Invention

The invention relates to X-ray intensifying screens and stimulable phosphor screens. More particularly it relates to compositions that increase the stability of both X-ray intensifying screens and stimulable phosphor screens.

2. Background of the Invention

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support, coated on both sides with a silver halide emulsion layer. During the X-ray irradiation said film is arranged in a cassette between two X-ray conversion screens each of them making contact with its corresponding silver halide emulsion layer.

According to another method of recording and reproducing an X-ray pattern disclosed e.g. in U.S. Pat. No. 3,859,527 a special type of phosphor is used, known as a photostimulable phosphor, which being incorporated in a screen is exposed to incident pattern-wise modulated X-rays and as a result thereof temporarily stores therein energy contained in the X-ray radiation pattern. At some interval after the exposure, a beam of visible or infra-red light scans the screen to stimulate the release of stored energy as light that is detected and converted to sequential electrical signals which are processable to produce a visible image. For this purpose, the phosphor should store as much as possible of the incident X-ray energy and emit as little as possible of the stored energy until stimulated by the scanning beam.

In both systems phosphor particles are dispersed in a binder and by coating the dispersion of phosphor particles on a support a supported screen is formed, or by casting the dispersion a self-supporting screen is formed. The screens have to withstand not only physical strains but also strain due to environmental causes especially humidity and heat. Due to humidity and heat, some phosphors, contained in the screen tend to decompose. This decomposition can be homogeneous, e.g. a coloration over all the surface of the screen, thus diminishing the speed of the X-ray system by absorbing emitted light (promptly emitted light as well as stimulated emission light). The deterioration of the screen due to phosphor decomposition can be local, thus diminishing the image quality of the system because in some place no image or a blurred image is formed.

It has been described in GB 1,575,511 that the derioration of X-ray intensifying screens comprising a halide-containing rare earth metal phosphor in which the host metal is a rare earth metal and the activator is one or more other rare earth metals or a barium fluoride chloride phosphor activated by europium(II) or a sodium activated CsI phosphor could be diminished by the addition to the screen of metal-organic substances. Although this disclosure claims the use of metal-organic substances, the examples of this disclosure are mainly focussed on organotin substances.

In EP-A 234 385 it is disclosed that a storage screen (i.e. a stimulable phosphor screen) comprising a iodine containing bariumflorohalide fosfor could be stabilized by the addition of organotin compounds and or compounds having an epoxygroup.

Up until now the stabilizing compounds had in practice to be organotin compounds. This restriction limits the degrees of freedom when preparing intensifying screens or stimulable phosphor screens. The binder, solvent and further ingredients of the coating solution of such a screen had always to be chosen so that there always was a compatibility with organotin compounds. Therefore it is still desirable to find further stabilizing compounds for use in both X-ray intensifying screen and (photo)stimulable screens.

3. OBJECTS AND SUMMARY OF THE INVENTION

It is an object of the invention to provide screens comprising prompt emitting phosphor particles, as well as screens comprising stimulable phosphor particles, that are basically insensitive to environmental influences.

It is another object of the invention to provide screens, as described above, that are stabilized against the influence of moisture.

It is an object of the invention to provide further means for stabilizing screens comprising prompt emitting phosphor particles or stimulable phosphor particles so that the degree of freedom during manufacture of said screens is enhanced.

Further objects and advantages will become clear from the detailed description hereinafter.

The objects of the invention are realized by providing a phosphor screen, characterised in that said screen comprises at least one stabilizer being an organic compound or an oligomeric or polymeric compound comprising moieties corresponding to the following general formula I:

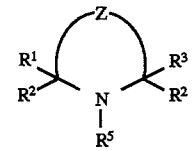

wherein:

$R^1$, $R^2$, $R^3$ and $R^4$ each independently represent a substituted or unsubstituted alkyl- or aryl group, $R^5$ represents hydrogen or a substituted or unsubstituted alkyl group and Z represents the atoms necessary to form a substituted or unsubstituted 5 to 8 membered ring In a preferred embodiment said screen comprises at least one organic compound or a oligomeric or polymeric compound comprising moieties corresponding to the following general formula II:

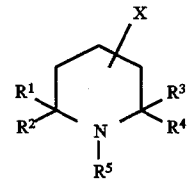

wherein:

$R^1$, $R^2$, $R^3$ and $R^4$ each independently represent a substituted or unsubstituted alkyl- or aryl group, R⁵ represents hydrogen or a substituted or unsibstituted alkyl group and X an arbitrary substitution.

4. DETAILED DESCRIPTION OF THE INVENTION

It was surprisingly found that screens, comprising prompt emitting phosphor particles as well as stimulable phosphor particles, (hereinafter the wording phosphor screen is used to include both screens, comprising prompt emitting phosphor particles and screens comprising stimulable phosphor particles) could be stabilized against degradation due to environmental influences (temperature, humidity, etc.) by the addition to the phosphor comprising layer of said screens of compounds having a ring structure comprising a —C—NH—C—sequence wherein the two carbon atoms in the vicinity of the NH group each are substituted by two alkyl or aryl groups. Said ring compounds may be single compounds as well as oligomeric or polymeric compounds comprising said ring structure as moieties making up (optionally with other moieties) said oligomeric or polymeric compounds. The ring structure corresponds to general formula I:

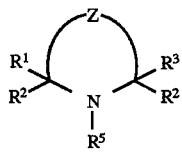

I wherein:

$R^1$, $R^2$, $R^3$ and $R^4$ each independently represent a substituted or unsubstituted alkyl- or aryl group, $R^5$ represents hydrogen or a substituted or unsibstituted alkyl group and Z represents the atoms necessary to form a substituted or unsubstituted 5 to 8 membered ring.

It is preferred to use, in a screen according to the present invention, piperidine derivatives that carry two alkyl or aryl groups in the 2 position as well as in the 6 position. Said piperidine derivatives can be single compounds as well as oligomeric or polymeric compounds comprising piperidine moieties that carry two alkyl or aryl groups in the 2 position as well as in the 6 position. In a general formula said piperidine compounds correspond to formula II:

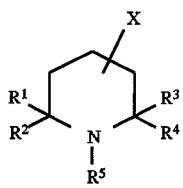

II wherein:

$R^1$, $R^2$, $R^3$ and $R^4$ each independently represent a substituted or unsubstituted alkyl- or aryl group.

$R^5$ represents hydrogen or a substituted or unsibstituted alkyl group and X an arbitrary substitution. Most preferred piperidine derivatives correspond to formula III, wherein the arbitrary substitution X is in the 4-position:

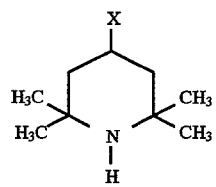

III

Specific examples of very useful compounds, according to the present invention, having a ring structure comprising a —C—NH—C— sequence wherein the two carbon atoms in the vicinity of the NH group each are substituted by two alkyl or aryl groups are compounds A1 to A3. A1 is an example of a single compound, A2 is a compound comprising 2 moieties having a ring structure comprising a —C—NH—C— sequence wherein the two carbon atoms in the vicinity of the NH group each are substituted by two alkyl or aryl groups and A3 is a polymeric compound comprsing moieties A3a and A3b.

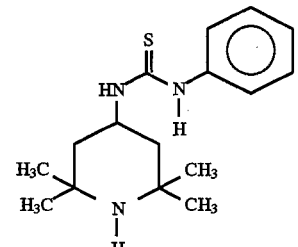

A1

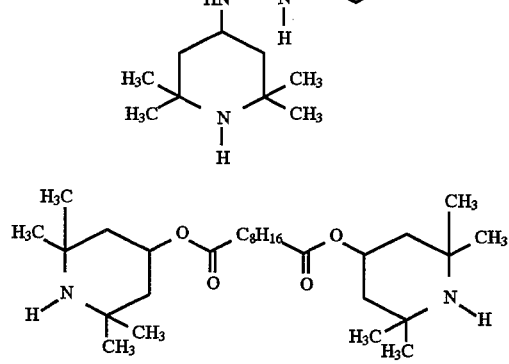

A2

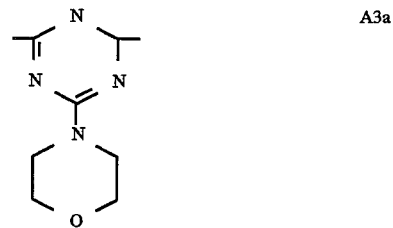

A3a

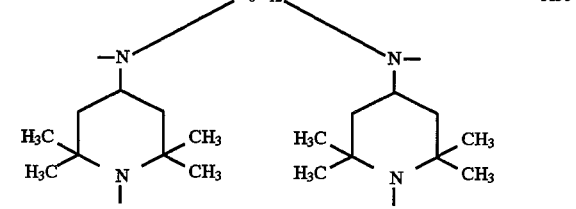

A3b

The compounds having a ring structure comprising a —C—NH—C— sequence wherein the two carbon atoms in the vicinity of the NH group each are substituted by two alkyl or aryl groups are mixed before the manufacture of the screen with the dispersion of the phosphor particles in a solvent and optionally a binder. The stabilizing compounds according to the present invention are adden in an amount of $10^{-2}$ mole % to 5 mole % with respect to the phosphor. Preferably said compounds are mixed in an amount between 0.2 mole % and 2 mole % with respect to the phosphor.

The compounds, according to this invention, having a ring structure comprising a —C—NH—C— sequence wherein the two carbon atoms in the vicinity of the NH group each are substituted by two alkyl or aryl groups can be used to stabilize any phospor, both stimulable (storage phosphors) and prompt emitting phosphors. Typical examples of storage phosphors employable in a radiation image storage screen of the present invention include:

SrS:Ce, Sm, SrS:Eu, Sm, ThO$_2$:Er, and La$_2$O$_2$S:Eu, Sm, as described in U.S. Pat. No. 3,859,527;

ZnS:Cu,Pb, BaO.xAl$_2$O$_3$:Eu, in which x is a number satisfying the condition of $0.8<x<10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5<x<2.5$, as described in U.S. Pat. No. 4,326,078;

M$^{III}$OX:xCe, in which M$^{III}$ is at least one trivalent metal selected from the group consisting of Pt, Nd, Pm, Sm, Eu, Tb, Dy, Ho, Er, Tm, Yb and Bi; X is at least one element selected from the group consisting of Cl and Br; and x is a number satisfying the condition of $0<x<0.1$, as described in Japanese Patent Provisional Publication No. 58(1983)-69281;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

$(Ba_{1-x}M^{II}_x)FX$:yA in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pt. Ho, Nd, Yb and Er, and x and y are numbers satisfying the conditions of $0<x<0.6$ and $0<y<0.2$ respectively, as described in U.S. Pat. No. 4,239,968.

Bariumfluorohalide phosphors as disclosed in, e.g., U.S. Pat. No. 4,239,968, DE OS 2 928 245, U.S. Pat. No. 4,261,854, U.S. Pat. No. 4,539,138, U.S. Pat. No. 4,512,911, EP 0 029 963, U.S. Pat. No. 4,336,154, U.S. Pat. No. 5,077,144, U.S. Pat. No. 4,948,696, Japanese Patent Provisional Publication No. 55(1980)-12143, Japanese Patent Provisional Publication No. 56(1981)-116777, Japanese Patent Provisional Publication No. 57(1982)-23675, U.S. Pat. No. 5,089,170 U.S. Pat. No. 4,532,071, DE OS 3 304 216, EP 0 142 734, EP 0 144 772, U.S. Pat. No. 4,587,036, U.S. Pat. No. 4,608,190, and EP 0 295 522.

$Ba_{1-x}Sr_xF_{2-a-b}Br_aX_b$:zA, wherein X is at least one member selected from the group consisting of Cl and I; x is in the range $0.10<x<0.55$; a is in the range $0.70<a<0.96$; b is in the range $0<b<0.15$: z is in the range $10^{-7}<z<0.15$, and A is Eu$^{2+}$ or Eu$^{2+}$ together with one or more of the co-dopants selected from the group consisting of Eu$^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine, as disclosed in EP 345 903.

Alkali metal phosphors comprising earth alkali metals as disclosed in e.g. U.S. Pat. No. 5,028,509 and EP 0 252 991. Alkalimetal phosphors as e.g. RbBr:Tl.

Halosilicate phosphors as disclosed in, e.g.,EP 304 121, EP 382 295 and EP 522 619.

Elpasolite phosphors as disclosed in European Application 94201578 filed on Jun. 17, 1994.

The compounds, according to the present invention, having a ring structure comprising a —C—NH—C— sequence wherein the two carbon atoms in the vicinity of the NH group each are substituted by two alkyl or aryl groups, can especially well be used to stabilize storage phosphor screens comprising a storage phosphor containing iodine, and are especially well suited for stabilizing bariumfluorohalide phosphors comprising iodine.

The compounds, according to the present invention, can be used to stabilize screens comprising any prompt emitting phosphor, e.g. CaWO$_4$, BaFCl, BaFBr, Ba(F,Cl,I)$_2$, Ba(F,Br,I)$_2$, Y-tantalate phosphors as described in e.g. EP-A 202 875, Gd$_2$O$_2$S, LaOX phosphors, where X is one of Cl, Br or I, etc. with or without dopants. The zinc-dithiocarboxylates can especially well be used to stabilize prompt emitting X-ray screens comprising a prompt emitting phosphor being a member selected from the group consisting of a halide-containing rare earth metal phosphor in which the host metal is a rare earth metal and the activator is one or more other rare earth metals, a barium fluoride chloride or bromide phosphor activated by europium(II), a barium fluoride chloride or bromide phosphor activated by europium(II) comprising iodine and a sodium activated CsI phosphor.

The screens comprising stabilizing compounds according to the present invention can be self supporting as well as supported. A supported and a self supporting screen comprise preferably a binder layer incorporating phosphor particles in dispersed form. The binder is preferably at least one film forming organic polymer, e.g. a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

When a binder is used, it is most preferred to use a minimum amount of binder. The weight ratio of phosphor to binder preferably from 80:20 to 99:1. The ratio by volume of phoshor to binding medium is preferably more than 85/15.

Preferably the binding medium substantially consists of one or more hydrogenated styrene-diene block copolymers, having a saturated rubber block, as rubbery and/or elastomeric polymers as disclosed in WO 94/00531. Particularly suitable thermoplastic rubbers, used as block-copolymeric binders in phosphor screens in accordance with this invention are the KRATON-G rubbers, KRATON being a trade mark name from SHELL.

The coverage of the phosphor is preferably in the range from about 5 and 250 mg/cm$^2$, most preferably between 20 and 175 mg/cm$^2$.

When the phosphor layer, comprising a stabilizing compound according to the present invention, is used as a supported layer on a support sheet, said support is made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 mm to 0.5 mm.

Screens comprising stabilizing compound according to the present invention, can be prepared by intimately mixing the phosphor in a solution of the binder and then coating on the support and drying. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calandered to improve the packing density (i.e. the number of grams of phosphor per cm$^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

In order to improve resolution it is possible to provide underneath the phosphor layer a layer absorbing the emitted light e.g. a layer containing carbon black or to use a coloured support e.g. a grey or black film support.

EXAMPLES

STABILIZING STIMULABLE PHOSPHOR SCREENS

1. PREPARATION OF THE STIMULABLE PHOSPHORS

All stimulable phosphor samples have been prepared in the following way:
The phosphor precursors:
  $BaF_2$: 0.819 mol
  $SrF_2$: 0.18 mol
  $NH_4Br$: 0.82 mol
  $NH_4I$: 0.15 mol
  $EuF_3$: 0.001 mol
  $CsI$: 0.003 mol.
forming a raw mix, were collected in a PE container, and the mix was homogenized for 15' on a jarr rolling mill. Next, the powder mix was transferred to a rotating blade mixer (Henschel Germany) and milled for 5' at 2,000 rpm under Ar atmosphere. Three crucibles containing 130 g of the mix each, were placed in a quartz tube. The quartz tube was sealed with a flange with a water lock at the gas outlet side. The sealed quartz tube was placed in an oven at 850° C., and the temperature was kept constant at this temperature during the three hour firing. During the firing the tube was flushed with Ar at a rate of 1.5 l/min. After the firing, the tube was taken out of the furnace and allowed to cool. After the cooling, the flange was removed and the three crucibles were taken out of the tube. The powder was milled and homogenized. A second firing was performed at 750° C., for 6 hours, under a 1.5 l/min 99.8% $N_2$/0.2% $H_2$ gas flow rate. Finally, the powder was deagglomerated with a pestle and mortar. The phosphor corresponded to the formula:

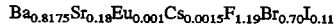

$$Ba_{0.8175}Sr_{0.18}Eu_{0.001}Cs_{0.0015}F_{1.19}Br_{0.70}I_{0.11}$$

2. PREPARATION OF THE STIMULABLE PHOSPHOR SCREENS

The phosphor was dispersed in a mixture of cellulose acetobutyrate/polyethylacetate binder. The solvents of the dispersion were methylethylketine, ethyleneglycolomonoethylether and ethylacetate. The phosphor was present in this dispersion a rato of 35% by weight with respect to the total weight of the dispersion. The dispersion is coated with a bar coater on a support, such as to have 1000 g phosphor per $m^2$. In the finished screen, the phosphor was present in 89% by weight with respect to the total weight of phosphor+binder. The screens, except the comparative screen comprised 1% by weight with respect to the weight of the phosphor of the stabilizing compounds.

3. MEASUREMENT OF STABILIZING EFFECT

The screens are subjected to an heat treatment of 45 minutes at 60° C. After this treatment the performance of the various screen was measured according to the procedure described herebelow. The phosphor screen is excited with an X-ray source operating at 85 kVp and 20 mA. For that purpose the Nanophos X-ray source of Siemens AG-W Germany was used. The low energy X-rays are filtered out with a 21 mm thick aluminum plate to harden the X-ray spectrum. After X-ray excitation the phosphor screen is transferred in the dark to the measurement setup. In this setup laser light is used to photostimulate the X-ray irradiated phosphor screen. The laser used in this measurement is a CW Single Mode He-Ne laser with power 30 mW.

The laser-optics comprise an electronic shutter, a beam-expander and a filter. A photomultiplier (Hamamatsu R 1398) collects the light emitted by the photostimulation and gives a corresponding electrical current. The measurement procedure is controlled by a Hewlett Packard Basic Controller 382 connected to a HP 6944 multiprogrammer. After amplification with a current to voltage convertor a TEKTRONIX TDS420 digital oscilloscope visualizes the photocurrent obtained. When the electronic shutter is opened the laser beam begins to stimulate the phosphor screen and the digital oscilloscope is triggered. Using a diagfraghme placed in contact with the screen the light emitted by only 7 $mm^2$ is collected. Only half the laser power reaches the screen surface. In this way the intensity of the stimulating beam is more uniform.

The signal amplitude from the photomultiplier is linear with the intensity of the photostimulating light and with the stored photostimulable energy. The signal decreases with a power law. When the signal curve is enterred the oscilloscope is triggered a second time to measure the offset which is defined as the component of error that is constant and independent of inputs. After subtracting this offset the point at wich the signal reaches l/e of the maximum value is calculated. The integral below the curve is then calculated from the start to this l/e point. The function is described mathematyically by $f(t)=A.e^{-t/\tau}$: wherein A is the amplitude, $\tau$ is the time constant, t is stimulation time, and e is the base number of natural logarithms.

The l/e point is reached when $t=\tau$ at which 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the screen and photomultiplier are such that 10% of the total emission is detected by the photomultiplier. After all these corrections have been made a conversion efficiency value (C.E.) is obtained in $pJ/mm^3/mR$. This value varies with screen thickness and therefore for measurements to be comparable they have to be carried out at constant phosphor coverage.

The stimulation energy (S.E.) is defined as the energy necessary to stimulate 63% of the stored energy and is expressed in $\mu J/mm^2$.

From the values C.E. and S.E. a figure of merit (F.O.M.) that is a value describing the sensitivity of the phosphor for practical use. F.O.M.=1000×C.E/S.E..

COMPARATIVE EXAMPLE 1 (C1)

A screen was prepared as described above, without the additon of any stabilizing substance. The performance of the screen was measured in terms of CE, SE and FOM.

EXAMPLES 1–3 (E1–E3)

For these examples, screens were prepared as describe above with the addition of stabilizing substances. The performance of the screens was measured in terms of C.E.2, S.E. and FOM.

The stabilizing substance used and the performance of the various screens are listed in table 1.

TABLE 1

| Nr. | Stabilizer | C.E.2 (pJ/mm³/mR) | S.E (µJ/mm²) | FOM |
|---|---|---|---|---|
| C1 | none | 1.5 | 30 | 50 |
| E1 | A1 | 44 | 14 | 3080 |
| E2 | A2 | 31 | 16 | 1980 |
| E3 | A3 | 58 | 15 | 4000 |

STABILIZING PROMPT EMITTING PHOSPHOR SCREENS

Prompt emitting phosphor screen were made by dispersing a LaOBr:Tm phosphor in mixture of solvent and KRATON G (trade mark name from SHELL). The mixture was coated on a polyethyleneterephthalate film support so that 90 mg phosphor was present per cm².

Two screens were prepared: C2 without any stabilizer, E4 with stabilizer A2.

MEASUREMENT OF STABILITY AGAINST HUMIDITY

The screen were cut into 4 seperate pieces. Four of these pieces were placed in an exsiccator filled with water that is maintained at 60° C. The relative humidity is 100%. After 6, 12, 18 and 24 one piece of the screen was taken out of the exsiccator and dried. After day 18, the three treated samples of the screen and one untreated sample of the screen were combined with a Blue sensitive X-ray film (AGFA CURIX RP1, trade name of Agfa-Gevaert NV, Mortsel, Belgium) and the sandwich exposed to X-rays of 70 kVp at a film focus distance of 1.5 m. The film/screen combination is exposed such as to give a density of 1.5 (±0.3) D on the film under the untreated screen sample. The difference in density of the film under the untreated sample and the density under the treated samples is taken as a measure of stability. The smaller the density difference, the more stable the screen. The results are given in Table 2.

TABLE 2

| Nr | Stabilizer | ΔD* | ΔD** |
|---|---|---|---|
| C2 | none | −0.285 | −0.375 |
| E4 | A2 | −0.240 | −0.315 |

*difference in density under the untreated screen and under the screen treated for 12 days.
**difference in density under the untreated screen and under the screen treated for 18 days.

We claim:

1. A phosphor screen, characterised in that said screen comprises at least one stabilizer being an organic compound or an oligomeric or polymeric compound comprising moieties corresponding to the following general formula I:

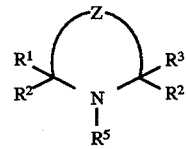

wherein:
$R^1$, $R^2$, $R^3$ and $R^4$ each independently represent a substituted unsubstituted alkyl- or aryl group,
$R^5$ represents hydrogen or a substituted or unsibstituted alkyl group and
Z represents the atoms necessary to form a substituted or unsubstituted 5 to 8 membered ring.

2. A phosphor screen according to claim 1, wherein said stabilizer is an organic compound or a oligomeric or polymeric compound comprising moieties corresponding to the following general formula II:

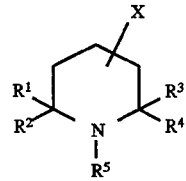

wherein:
$R^1$, $R^2$, $R^3$ and $R^4$ each independently represent a substituted or unsubstituted alkyl- or aryl group,
$R^5$ represents hydrogen or a substituted or unsibstituted alkyl group and X an arbitrary substitution.

3. A phosphor screen according to claim 1, wherein said stabilizer is present in an amount of $10^{-2}$ mole % to 5 mole % with respect to the phosphor.

4. A phosphor screen according to claim 1, wherein said screen comprises a stimulable phosphor.

5. A phosphor screen according to claim 4, wherein said stimulable phosphor is a bariumfluorohalide phosphor comprising iodine.

6. A phosphor screen according to claim 1, wherein said screen comprises a prompt emitting phosphor.

7. A phosphor screen according to claim 6, wherein said prompt emitting phosphor is a member selected from the group consisting of a halide-containing rare earth metal phosphor in which the host metal is a rare earth metal and the activator is one or more other rare earth metals, a barium fluoride chloride or bromide phosphor activated by europium(II), a barium fluoride chloride or bromide phosphor activated by europium(II) comprising iodine and a sodium activated CsI phosphor.

* * * * *